July 25, 1944.  E. STRASSER  2,354,409
LAMINATED SOLDER FILLED SHEET METAL
Filed June 7, 1939
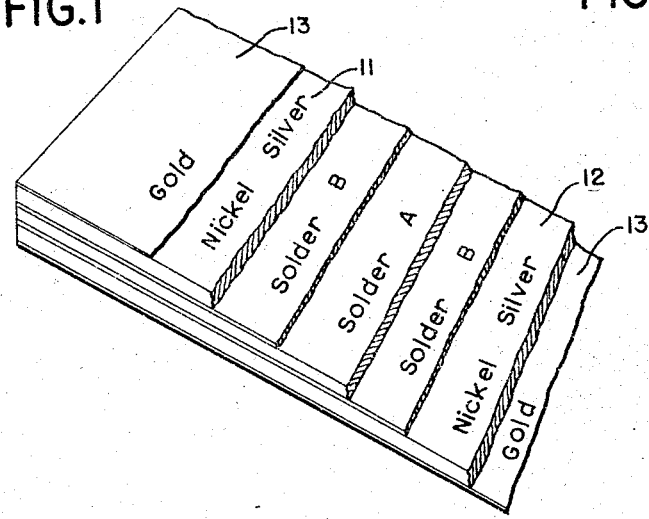
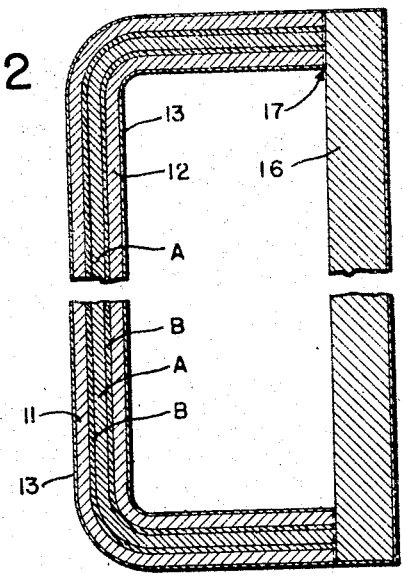
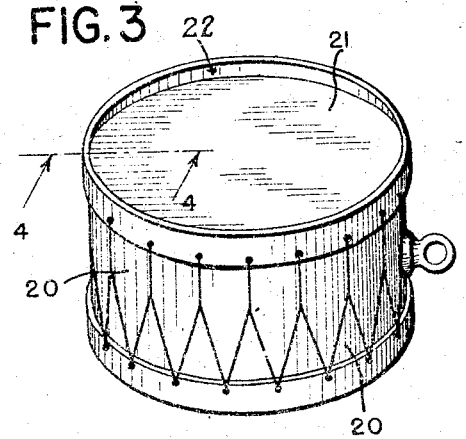
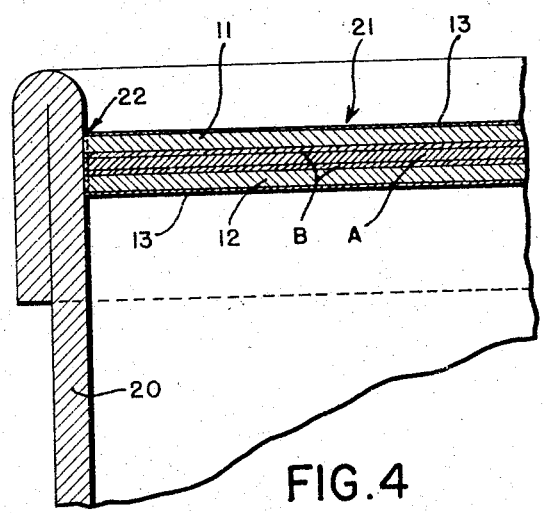
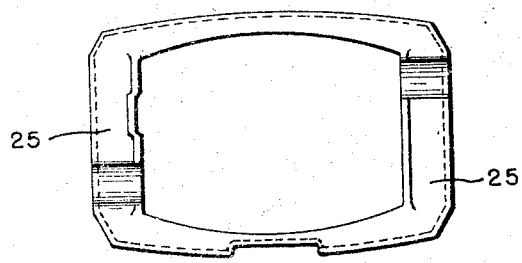
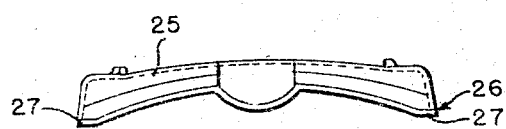
INVENTOR
EDWARD STRASSER
BY Bohbbur + Ledbetter
ATTORNEYS Patented July 25, 1944

2,354,409

UNITED STATES PATENT OFFICE 2,354,409

LAMINATED SOLDER-FILLED SHEET METAL

Edward Strasser, Rockville Centre, N. Y., assignor to I. Stern & Co., Inc., New York, N. Y., a corporation of New York Application June 7, 1939, Serial No. 277,839

1 Claim. (Cl. 29—181)

This invention relates to a new and useful laminated solder-filled sheet metal for use in the manufacture of sheet metal assemblies.

The main object of my invention is to make a sheet of solder-filled metal in which there is incorporated, for resoldering operations, sufficient solder for joining the edge or edges of blanks or stampings made therefrom to other parts used in the making of jewelry or the like without the addition of solder to the edge-soldered joint to be formed other than that comprising a part of the sheet material itself.

Another important object of my invention is to produce sheet material in which at least two outer sheets of metal are joined in spaced relation by laminated solder, or a substantially thick sheet of solder, so that in addition to the presence of the solder layer or layers, suitable and sufficient to join the two sheets of metal together, there is also provided an adequate amount of solder available for the purpose of soldering articles made from my new material to other pieces of material as desired.

A further object is to produce laminated sheet metal stock containing a relatively thick filler or layer of solder encased and held in place by adjacently spaced sheets so that the flow of solder is controlled and will exude or run by capillary attraction to the surface of a contiguous member or other material, with which the edge of my new sheet metal stock is adapted to be joined, and doing so without the solder becoming visible at the soldered joint.

Other objects and advantages of my invention will either become apparent from a detailed description thereof or will be referred to hereinafter in reference to the accompanying drawing, in which Figure 1 is a diagrammatic perspective illustration of my laminated or composite sheet material having a relatively thick solder filler, the laminations being broken away and labelled for convenient understanding of the structure of this new metal.

Figure 2 shows in cross-section a cup-shaped stamping made from material of the class described and edge-soldered to a flat piece of other material.

Figures 3 and 4 show, by way of illustration, a type of watch charm, one piece of which may be made from this new material and edge-soldered to the other piece of the charm, Figure 4 being a section on the line 4—4 of Figure 3.

Figures 5 and 6 show another use to which my material may be put, namely, that of making watch case bezels and the like, the edges of which are well suited to the technique of edge-soldering.

Referring now to Figure 1, wherein I illustrate one preferred form of material made in accordance with my invention, it will be seen that two spaced sheets of metal 11 and 12 are joined by and act to encase one or more, say three layers of solder. The central layer of solder A is comparatively thick and has a relatively high fusing temperature, while the layers of solder B, disposed on either side of the solder A, are comparatively thin, with respect to the layer A, and have, also with respect to the solder A, relatively low fusing temperatures. The solder layer BAB is relatively thick whether composed of one or more solder layers.

Sheets 11 and 12 shown in the drawing illustrate, by way of example, a rolled compound metal stock having a layer 13 of precious metal plated thereto, in which case the sheets 11 and 12 will be understood to be any suitable backing material of non-precious metal. For certain work, such for example as making inexpensive watch case bezels and the like, the plates 11 and 12 may be made of nickel silver without the addition of the precious metal plates 13 as described above and shown in the drawing. The plated sheet metal 12, 13 is commonly known as "gold-filled" stock, and may be used to plate one or both outer surfaces of my laminated sheet metal if desired.

A preferred or satisfactory method now employed for making my composite material is to first produce an ingot in the usual way by forming into a stack the layers of materials having for example an overall total thickness of approximately .75 of an inch. This ingot stack is formed by using two plates or sheets of nickel-silver 11 and 12 or other sheet material each of which is approximately .250 of an inch in thickness, with a central plate or sheet of solder filler A having a relatively high fusing temperature and a thickness of approximately .250 of an inch, and a layer or sheet of solder B having a relatively low fusing temperature and a thickness of approximately .002 of an inch disposed, respectively, between the solder A and one of the sheets of nickel-silver. It is from this ingot of about three-quarters of an inch thickness, more or less, that my thin sheet metal is produced by rolling and drawing it down until it is sufficiently thin for commercial use.

To unite the material after the outer sheets of metal 11 and 12 are stacked with one or more sheets of solder between them and disposed in the order shown and described, the sheets may be clamped or otherwise suitably held together in the usual way, merely to prevent their sliding apart or displacement, by plating irons and the unit placed in a soldering furnace and heated to a temperature sufficient to fuse the thin solder B and unite the plates 11 and 12 with the thick sheet of solder A between them.

It will be understood, in producing the ingot in the above described usual manner, that the temperature and time operating conditions, under which the solder B fuses and unites all the layers, prevent the melting and flowing of the thick solder supply A with the result that it remains free and in a form adapted for subsequent use in the fabrication and resoldering of articles by edge-soldering operations.

Some of the solder BAB is absorbed into the outer sheets 11 and 12 in making the bond between them, but a portion remains unabsorbed (due to the substantial initial stickiness of the layer or layers BAB) and free not only to constitute a part of the stock thickness of the ingot, and hence a part of the thin sheet metal rolled therefrom, but also to constitute a reservoir or supply of solder to effect edge-soldered linearly-extending joints when this new metal is used by the trade.

After uniting the three major sheets, namely, sheets 11 and 12 and the solder sheet A by means of the two solder sheets B, the composite block or ingot is then subjected to a rolling, drawing, or other mechanical process whereby the same is reduced to a sheet form of any desired thickness. The solder layer retains its thickness in relative original proportion which is much thicker than need be for merely bonding the metal sheets together.

If, from material prepared as above described, blanks are cut or shapes formed such for example as that shown in Figure 2, and it is desired to solder the blank to a base 16, the joint 17 between the two pieces may be soldered automatically by merely placing the assembled pieces for a suitable time in a furnace having a temperature sufficient to fuse the solder A and cause the same to exude, run or diffuse, by capillary attraction and control, into the joints edge-soldered at 17. These soldered joints 17 are indicated by a dotted line and are formed by capillary flow of the fused solder localized to and concealed at the edge-soldered joint area where my new metal sets edgewise against a piece of conventional metal.

While the soldering temperature required to edge-solder the joint 17 is higher than that initially used to fuse the solder B and join or bond the layers of material to form the ingot, I find that for some reason, perhaps due in part to the mechanical working or rolling to which the material was previously subjected to reduce it down to a commercially-useful thickness, that the bonding joint in the material itself previously formed by the solder B will not be damaged. This may be due to the fact that the three solder layers BAB have become one mass.

Figures 3 and 4 illustrate a watch charm made in the form of a drum in which a body 20 is formed of any suitable tubular material with each end closed by a head 21 in the form of a disc blanked out of this new sheet material, such that the circumferential joint 22 between the heads and body may be edge-soldered as above described.

Figures 5 and 6 illustrate a watch case bezel 25 stamped and drawn from material such as here described after which the joint 26 between the bezel 25 and a base 27 may be soldered as above described, by edge-soldering or fusing.

Referring again to Figure 1, it will be understood that if it were desired to gold plate my new sheet metal, and if nickel-silver were used as a backing metal, sheets of gold 13 (having sheets of suitable solder interposed between them and the nickel silver) would be added to the stack of material and united in the soldering furnace as above described, and the ingot thus formed would be worked, also as above described, until the several layers of material and overall thickness were reduced to the desired dimensions and a corresponding sheet of laminated gold plated metal were formed.

For some forms of work I have found it desirable to produce an ingot having an initial thickness of approximately 1.25 inches by making one of nickel-silver sheets .75 of an inch thick, and after uniting the sheets, working the same as above described. It will be understood that both the initial and final thickness of the material, including the solder layers, will be dictated by the character of the product in which the material is ultimately used.

This new laminated precious sheet metal possesses the advantage of use in connection with uniformly and automatically soldering its edges to the flat surface of another sheet, as indicated at the concealed edge-soldered joints 17, 22 and 26. The thick slab of solder serves to separate the outer layers of metal in spaced relation, and the two spaced outer sheets form a carrier or housing space adequate to hold an amount of solder sufficient to constitute a supply for the purpose of soldering the edge of this new metal to another part without the addition of solder by the person performing the soldering operation. Also, the two outer sheets control the capillary flow of solder and confine it to the concealed area of the joint by preventing the solder from breaking away from its internal space between the separated sheets of metal.

While I have now shown and described for the purpose of illustration a form of my invention employing certain specific metals such as gold and nickel-silver, it is to be understood that the same is not limited to the use of these metals, and that other changes may be made without departing from the principle of the invention as suggested by the claim herein.

I claim:

Sheet metal material sufficiently thin for commercial use in the manufacture of jewelry and the like, consisting of spaced sheets of metal, and a layer of solder filler encased between said spaced sheets of metal, a portion of which solder filler bonds by absorption with and into the spaced sheets of metal, and the remainder of which solder filler is free and is adapted as a solder supply for subsequently bonding said sheet metal material along its linearly-extending edges to another metallic member by the application of heat sufficient to fuse said free solder filler and cause a portion thereof to exude from the edges of the spaced sheets and to flow by capillary attraction into that area concealed between said edges and said other metallic member, whereby a concealed solder-bonded joint is effected automatically merely by said heat application.

EDWARD STRASSER.